United States Patent [19]

Krekeler et al.

[11] 4,053,565

[45] Oct. 11, 1977

[54] SILICA XEROGELS

[75] Inventors: Jerome H. Krekeler, Cincinnati, Ohio; William Kirch, Clinton, Iowa; Henri A. Aboutboul, Brussels, Belgium

[73] Assignee: National Petro Chemicals Corporation, New York, N.Y.

[21] Appl. No.: 437,274

[22] Filed: Jan. 28, 1974

Related U.S. Application Data

[60] Continuation-in-part of Ser. No. 294,270, Oct. 10, 1972, abandoned, Ser. No. 326,645, Jan. 26, 1973, abandoned, Ser. No. 311,579, Dec. 4, 1972, abandoned, and Ser. No. 383,203, July 27, 1973, abandoned, said Ser. No. 294,270, is a continuation of Ser. No. 70,622, Aug. 14, 1970, abandoned, which is a continuation-in-part of Ser. No. 750,733, Aug. 6, 1968, Pat. No. 3,652,214, Ser. No. 750,734, Aug. 6, 1968, Pat. No. 3,652,215, and Ser. No. 766,693, Oct. 11, 1968, Pat. No. 3,652,216, said Ser. No. 326,645, is a continuation of Ser. No. 148,117, May 28, 1971, abandoned, which is a division of Ser. No. 750,734, , said Ser. No. 311,579, is a continuation of Ser. No. 122,502, March 9, 1971, abandoned, which is a continuation of Ser. No. 750,467, Aug. 6, 1968, abandoned, said Ser. No. 383,203, is a continuation of Ser. No. 122,503, March 9, 1971, abandoned, which is a division of Ser. No. 750,467.

[51] Int. Cl.$^2$ .............................................. C01B 33/16
[52] U.S. Cl. .................................... 423/338; 423/335; 423/339; 252/451
[58] Field of Search ................. 423/339, 335, 338; 272/451

[56] References Cited

U.S. PATENT DOCUMENTS

| | | | |
|---|---|---|---|
| 1,900,859 | 3/1933 | Connolly et al. | 423/335 |
| 2,699,376 | 1/1955 | Hay | 423/335 |
| 3,081,154 | 3/1963 | Acker et al. | 423/339 |
| 3,417,028 | 12/1968 | Montgomery et al. | 423/338 X |
| 3,428,425 | 2/1969 | Marotta | 423/339 |
| 3,453,077 | 7/1969 | Hyde | 423/338 |
| 3,652,215 | 3/1972 | Aboutboul et al. | 423/338 |
| 3,652,216 | 3/1972 | Krekeler et al. | 423/338 |

OTHER PUBLICATIONS

Book "The Colloid Chemistry of Silica and Silicates" 1955 Ed. by Ralph K. Iler, pp. 128 and 137, Cornell University Press, Ithaca, New York.

*Primary Examiner*—Edward Stern
*Attorney, Agent, or Firm*—Kenneth D. Tremain

[57] ABSTRACT

Silica xerogels having pore volumes greater than about 2.0 cc/g., the major portion of which volumes are provided by pores having pore diameters ranging from 300 to 600 A, and surface areas ranging from 200 to 500 m$^2$/g. Xerogels having such cumulative pore volume, pore diameter distribution, and surface area characteristics are useful as supports for stereospecific catalysts for particle form olefin polymerization reactions effecting the production of low molecular weight, high melt index polyolefins.

2 Claims, 3 Drawing Figures

SILICA XEROGELS

CROSS REFERENCES TO RELATED APPLICATIONS

This application is a continuation-in-part of copending application Ser. No. 294,270 filed Oct. 10, 1972 (now abandoned) which, in turn, is a continuation of abandoned application Ser. No. 70,622 filed Aug. 14, 1970 and which, in turn, was a continuation-in-part of each of applications Ser. Nos. 750,733 filed Aug. 6, 1968 (now U.S. Pat. No. 3,652,214), Ser. No. 750,734 filed Aug. 6, 1968 (now U.S. Pat. No. 3,652,215), and Ser. No. 766,693 filed Oct. 11, 1968 (now U.S. Pat. No. 3,652,216).

This application is also a continuation-in-part of abandoned application Ser. No. 326,645 filed Jan. 26, 1973 which, in turn, is a continuation of abandoned application Ser. No. 148,117 filed May 28, 1971 and which, in turn, was a division of the aforesaid application Ser. No. 750,734 filed Aug. 6, 1968.

This application is also a continuation-in-part of copending application Ser. No. 311,579 filed Dec. 4, 1972 (now abandoned) which, in turn, is a continuation of abandoned application Ser. No. 122,502 filed Mar. 9, 1971 and which, in turn, was a continuation of abandoned application Ser. No. 750,467 filed Aug. 6, 1968.

This application is also a continuation-in-part of abandoned application Ser. No. 383,203 filed July 27, 1973 and which, in turn, is a continuation of abandoned application Ser. No. 122,503 filed Mar. 9, 1971 as a division of the aforesaid abandoned application Ser. No. 750,467 filed August 6, 1968. The polymerization catalysts for which the silica xerogels of the present invention may be carriers are claimed in application Ser. No. 311,579. The olefin polymerization processes in which such catalysts may be employed are claimed in application Ser. No. 383,203.

BACKGROUND OF THE INVENTION

1. Field of the Invention

This invention relates to silica xerogels having physical characteristics making them useful as catalyst supports and, more particularly, to xerogels having cumulative pore volumes, pore diameter distributors, and surface areas which uniquely qualify such materials as supports for stereospecific catalysts for particle form olefin polymerization reactions in which relatively low molecular weight, high melt index polyolefins are produced.

2. The Prior Art

Silica gels find numerous applications, chief amongst which are as adsorbents and catalyst supports. The latter application in particular has attracted increasing attention in recent years, especially in connection with catalysts for the stereospecific polymerization of olefins. Catalysts having stereospecific activity include metal-containing catalytic materials, e.g. chromium oxides, deposited on silica or, alternatively alumina, supports which have previously been activated by oxidation at elevated temperatures. Olefins may be polymerized with such catalysts to produce a varied series of polymers having differing molecular weights and melt indexes, depending upon the particular temperatures, pressures, solvents or other diluents, catalysts, or other reaction conditions used.

For many applications the production of low molecular weight, high melt index polymers is of particular advantage, such materials finding important applications in films and sheets, extrusion coating, injection and rotational molding, and the like. Considering the preparation of ethylene polymers as illustrative, low molecular weight (high melt index) polyethylenes are commercially obtained by carrying out the polymerization in solution (the "solution process"), but only with conversions of less than about 1,000 pounds of polyethylene per pound of supported catalyst (equivalent to $\geq 10$ ppm as Cr on a polymer basis as Cr content of supported catalyst is $\geq 1\%$). On the other hand, when the reaction is carried out in suspension (The "suspension" or "particle form" process), it is possible to obtain conversions of from about 5,000 to 15,000 pounds of polyethylene per pound of supported catalyst having Cr content of $\leq 1\%$ (equivalent to $\leq 2$ ppm Cr on a polymer basis). Moreover, it is necessary in the solution process, in order to preserve the color and desired appearance of the product resin, to maintain the chromium content in the resin lower than about 2.5 ppm. The catalyst must, therefore, be removed from the polymer product formed in the solution process. The catalyst need not, however, be so removed during particle form processing. The particle form process thus exhibits distinct commercial advantages relative to the solution process for the stereospecific polymerization of olefins.

Heretofore, however, particle form or slurry operations have been limited, at high conversion rates equal to or greater than about 5,000 pounds of polyethylene per pound of catalyst, to the production of polyolefins having melt indexes lower than about 2. Various techniques have been proposed to increase the melt indexes of olefin polymers so produced, with varying degrees of success. For example, while the use of modifiers such as hydrogen has been found to decrease the molecular weight and increase the melt index of the polymer product, the advantages attendant the use of such materials are limited since they simultaneouly decrease catalyst activity. Similarly, variation of the chromium oxide content of the catalyst, addition of different metal oxide promoters, combination of different supports and/or the use of varying catalyst activation temperatures, have been widely investigated, with only marginal improvement.

Modification of the porosity, surface area and other characteristics of the catalyst support has also been suggested as a means for increasing the melt index of olefin polymers produced by particle form stereospecific polymerization reactions. Thus, in recent years a number of procedures have been described in the literature for the preparation of silica gel materials said to be useful as catalyst supports for this purpose. Such procedures are described, for example, in U.S. Pat. Nos. 3,132,125 and 3,225,023; and in British Pat. No. 1,007,722. Silica gels so prepared have not, however, achieved their intended purpose, i.e., the production of olefin polymers having markedly increased melt indexes.

Thus, for example, Schwander et al U.S. Pat. No. 3,132,125 describes the use in both solution and suspension processes of stereospecific catalysts supported on non-porous silicas for the production of polyolefins said to have relatively low average molecular weights and, correspondingly, high melt indexes. Relatively high melt index polymers were in fact produced in the solution phase operations exemplified by Schwander et al. Where, however, particle form operations were utilized use of the catalyst described in this patent resulted in the preparation of polymer products having melt indexes (estimated from the molecular weight data set forth by Schwander et al) no greater than about 0.2.

Hogan et al U.S. Pat. No. 3,225,023, assigned to Phillips Petroleum Company, suggests that olefin polymers having increased melt indexes may be produced employing catalyst supports having increased average pore diameters, ranging from about 60 to 400 A. Hogan et al illustrate their process by experimental runs (which may have been conducted in either the solution or suspension phases), employing "commercial silica gel" supports having varying average pore diameters. The use of silica gels of the type commercially available as of the Hogan et al filing date (November, 1962) and having the indicated range of average pore diameters has not, however, resulted in the formation of very high melt index polymers employing particle form operations. Thus, polyethylenes so produced (Employing chromium oxide catalysts deposited on such supports) have melt indexes of only up to about 3.0.

British Pat. No. 1,007,722, also assigned to Phillips Petroleum Company, describes the use of "a specific form of high purity finely divided porous silica gel" as a support for a chromium oxide catalyst said to be capable of producing relatively high melt index polyethylenes in a particle form polymerization. The specific form of silica gel referred to in the British specification is a silica aerogel having a pore diameter between approximately 200 A and 500 A, a surface area of approximately 250 to 350 m²/g, a density of less than approximately 0.2 g/ml., and an oil adsorption of approximately 300 lbs/100 lbs. "Syloid" 244 (having a surface area of 250 m²/g, a pore volume of 2.2 cc/g, and a pore diameter of 350 A) is the sole such material exemplified.

Aerogels are silica gels in which the liquid phase has been replaced by a gaseous phase in such a way as to avoid shrinkage as occurs by direct evaporation of the liquid phase thereof (materials prepared in the latter manner being termed xerogels); Iler, *The Colloid Chemistry of Silica and Silicates*, Cornell University Press, pages 137 and 152. Aerogels are, however, subject to subsequent shrinkage when wetted due to coalescence of their ultimate particles. Shrinkage of this nature decreases porosity and markedly impairs the use of these materials as stereospecific catalyst supports. Moreover, aerogels readily disintegrate when subjected to mechanical stress. Thus, it has been found that the use of silica aerogels as catalyst supports in the particle form process is less than satisfactory.

Nor have other recently disclosed silica gel materials having varying porosity and surface area characteristics proved adequate to effect the production of high melt index olefin polymers in particle form operations. Such materials are disclosed, for example, in U.S. Pat. Nos. 2,731,326; 3,403,109; 3,428,425; and 3,669,624; and in British Pat. No. 1,077,908.

As illustrative, Hyde U.S. Pat. No. 3,453,077, and British Pat. No. 1,077,908, both of which are assigned to W. R. Grace and Co., disclose methods said to result in the preparation of "microspheroidal silica gels" having pore volumes within the range of from as low as 0.3 cc/g (the British specification) to as much as 2.5 cc/g (the U.S. patent), and surface areas within the range of from 100 to 800 m²/g. These references describe procedures for the preparation of silica gels involving gelling alkali metal silicate solutions with gaseous carbon dioxide or mineral acids, neutralizing either about half (the British specification) or substantially the entire alkali metal silicate content of the hydrogels thus formed, aging the neutralized gels (and, in the case of the U.S. patent, making the gel pH alkaline with ammonium hydroxide), thereafter spray-drying the hydrogel to remove the liquid phase, washing the spray-dried material and re-drying the same for subsequent use. It has, however, been found that these procedures do not enable one to prepare silica gel materials having cumulative pore volumes as large as 2.0 cc/g. Moreover, when silica gels thus made are used as supports for stereospecific catalysts in the particle form polymerization of ethylene, polyethylenes having melt indexes of only up to about 2 are obtained.

From the preceding it will be seen that prior efforts to produce relatively high melt index olefin polymers in particle form operations by the use of modified silica gel catalyst supports and/or other techniques have not been entirely satisfactory. It is therefore a principal object of the present invention to provide an improved silica gel material which, when employed as the support for a stereospecific catalyst utilized in the particle form polymerization of olefins, effects the production of polymers having substantially higher melt indexes than heretofore obtained in such operations. Other objects and advantages of the present invention will be apparent from the following description of the nature and preferred embodiments of the improved silica gel materials hereof.

SUMMARY OF THE INVENTION

In accordance with the present invention an improved silica xerogel is provided having a pore volume greater than 1.96 cc/g, i.e. greater than about 2.0 cc/g, the major portion of which pore volume is provided by pores having average pore diameters within the range of from about 300 to 600 A; and a surface area within the range of from about 200 to 500 m²/g. The pore volume of the xerogel is suitably provided by pores having a narrow pore diameter distribution primarily within the indicated 300 to 600 A range. It has been found that silica xerogels having the indicated cumulative pore volume, average pore diameter and surface area characteristics specified supports for stereospecific catalysts which are effective in particle form olefin polymerization reactions to produce olefin polymers having markedly higher melt indexes than heretofore obtained. For example, employing the silica xerogels of the present invention polyethylenes may be readily thus produced having melt indexes in excess of 2.0, and up to about 15.

Preferably, the silica xerogels hereof have cumulative pore volumes ranging from about 2.0 to 3.5 cc/g, with about 70% or more of the pore volume being provided by pores having an average pore diameter within the approximate 300 to 600 A range. Use of such materials as supports for stereospecific catalysts, e.g. chromium oxide-containing catalysts, in particle form ethylene polymerization reactions results in the formation of polyethylenes having particularly advantageous, high melt indexes ranging from about 3 to 12.5.

The silica zerogels of the invention, and particularly the porosity and surface area characteristics thereof, are described in terms of their pore volumes (PV), surface areas (SA), and average pore diameters (PD). The surface area is determined by the standard BET method described by Brunauer, Emmett and Teller, J. Am. Chem. Soc., 60, 309 (1938). The pore volume is determined by the well known nitrogen adsorption-desorption technique described, for example, in *Catalysis*, Vol.

II, pgs. 111–116, Emmett, P.H., Reinhold Publishing Corp., New York, N.Y., 1955 (Run to a P/Po of 0.967 which is equivalent to 600 A pore diameter) and elsewhere. The average pore diameter may be calculated from this data as follows:

$$\overline{PD}(\text{Å}) = \frac{4\ PV\ (\text{cc/g})}{SA\ (\text{m}^2/\text{g})} \times 10^4$$

It should further be understood that, as used herein, "pore volume" and "cumulative pore volume" are synonymous, and refer to the total volume of the pores which comprise the xerogel structure per unit weight thereof. Similarly, the terms average of mean "pore diameter" or "pore size" are used interchangeably herein, and refer to a one-point representation of an actual distribution calculated by the above formula which is based on the geometric model of a right circular cylinder.

The pore volumes referred to herein refer to the gel volumes determined by permitting nitrogen gas to be adsorbed by and condensed in the pores of the gel at the normal boiling point of liquid nitrogen and at some relative pressure P/Po, wherein P is the pressure of the nitrogen vapor over the gel and Po is the vapor pressure of liquid nitrogen. For silica gels, the determination of this nitrogen pore volume at a relative pressure P/Po = 0.967 permits computation of the volume of those pores having diameters of up to 600 A, which principally contribute to the gel surface phenomena.

The pore volumes of xerogels of the present invention should be contrasted with the water pore volume measurement occasionally used for the evaluation of silica gels determined in accordance with the method of Innes, Analytical Chemistry, 28, 332–4 (1956). The latter method gives a result which sums the pore volume in all pores from the very smallest through the macro-pores, or 0 to > 1,500 A diameter. This is in contrast with the $N_2$ adsorption method which when run to a P/Po of 0.967 sums the pore volume in pores from 0–600 A diameter (i.e., micro-pores). Such a method (i.e., the water pore volume) is, therefore, not discriminating enough for measuring the pore volume of the silica xerogels hereof, the major portion of which is provided by pores having pore diameters within the range of from about 300 to 600 A. For such materials it is rather necessary to determine pore volume by measurement of the volume of liquid nitrogen adsorbed per gram of the dry gel in accordance with the technique known in the art (see also Barrett, Joiner, and Halenda, J. Am. Chem. Soc., 73, 373 (January, 1951).

The silica xerogels of the present invention are prepared in accordance with the methods disclosed in the aforesaid U.S. Pat. Nos. 3,652,214; 3,652,215; and 3,652,216; and the respective continuation in part applications thereof, applications Ser. Nos. 191,977; 191,978; and 192,134. The methods described in the noted prior disclosures (which are incorporated herein by this reference) involve the following steps for preparation of the silica xerogel:

1. Precipitating a silica hydrogel, under conditions of good agitation, by neutralizing an aqueous alkaline silicate solution, e.g. with a strong acid, a weak acid such as $CO_2$, an ion exchange resin, or by other suitable means to produce a silica hydrogel slurry, employing the following conditions:
    a. the neutralizing medium is added to the aqueous alkaline silicate solution at a rate such that the gel point of the solution is reached in from about 30–120 minutes, e.g. at a rate of up to 40% of the needed amount in 30–120 minutes and the remaining 60% in from about 20–90 minutes more,
    b. the temperature during precipitation is maintained between about 0° and 17° C.,
    c. the $SiO_2$ concentration in the final slurry is between about 5 and 12% by weight, and
    d. the final pH of the hydrogel slurry is from pH 3–8;
2. Maintaining the hydrogel slurry at a pH within the range of pH 3–8 at a temperature and for a time sufficient to strengthen the hydrogel structure;
3. Reducing the concentration of the alkaline material in the hydrogel by washing the same with a liquid which displaces the alkaline material, until the wash liquor recovered contains less than about 20 ppm of the alkaline material, expressed as salt thereof; and
4. Drying the resulting product, either by vacuum freeze-drying (specifically as described in the aforesaid U.S. Pat. No. 3,652,214 and the continuation-in-part thereof, Ser. No. 191,977), solvent displacement (specifically as described in the aforesaid U.S. Pat. No. 3,652,215 and the continuation-in-part thereof Ser. No. 191,978), or azeotropic distillation (specifically as described in the aforesaid U.S. Pat. No. 3,652,216 and the continuation-in-part thereof, Ser. No. 192,134).

The composition, uses and advantages of the silica xerogels of this invention will be more fully understood from the following description of preferred embodiments thereof, taken in connection with the accompanying drawings in which:

PREFERRED EMBODIMENTS OF THE INVENTION

Figure 2:
FIG. 2 is a graph representing the pore size distribution, as a function of the cumulative pore volume, of the silica gel of Example II-2 below in which an azeotropic distillation technique is utilized to dry the gel material.
Figure 1:
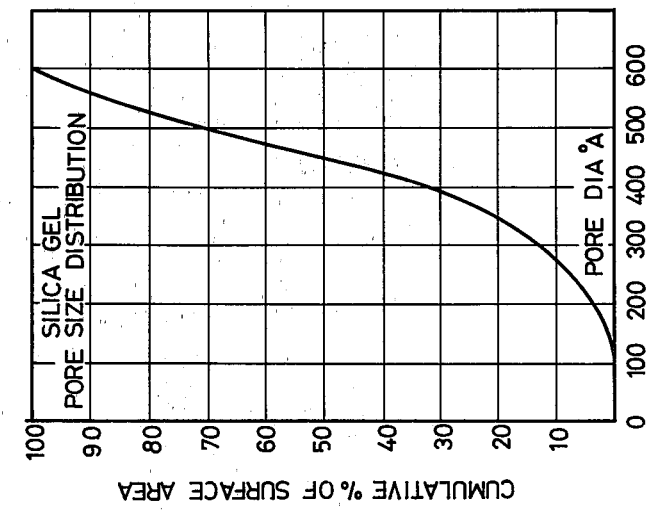
FIG. 1 is a graph representing the pore size distribution, as a function of the cumulative surface area, of the silica gel of Example 1 below in which a solvent displacement technique is employed for drying the hydrogel material.
Figure 3:
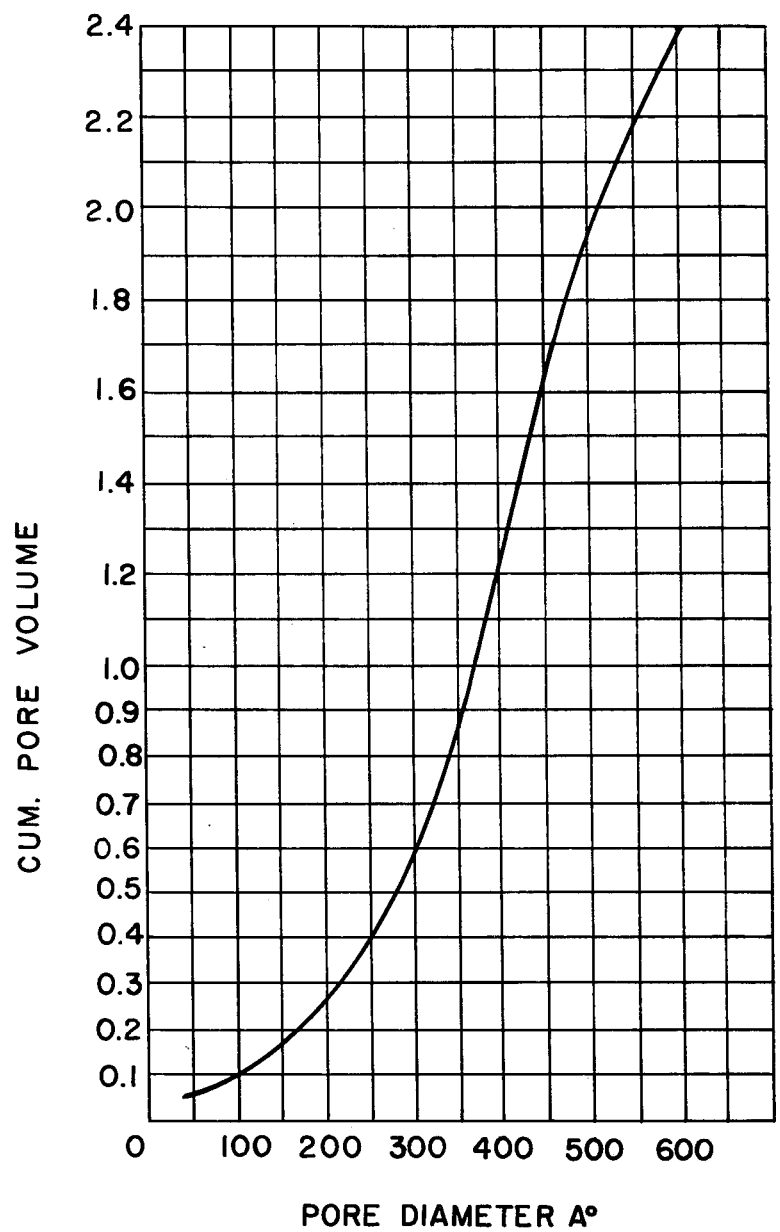
FIG. 3 is a graph representing the pore size distribution, as a function of the cumulative pore volume, of the silica gel of Example III-1 in which a vacuum freeze drying technique is employed for drying the gel.

As indicated hereinabove, the silica xerogels of the present invention are desirably used as supports for stereospecific polymerization catalysts wherein the catalytic material is preferably a metal oxide, especially chromium oxide. Such catalysts are particularly useful in the polymerization of a 1-olefin, e.g. ethylene, having a maximum of 8 carbon atoms in the chain and no branching nearer the double bond than the 4-position. It may be used in the homopolymerization of such monomer, or in the copolymerization thereof with one or more additional 1-olefin monomers.

Employing the silica xerogel catalyst support hereof, markedly high melt index, low molecular weight polymers are thus obtained. Such is particularly true in the particle form polymerization of ethylene. The polymers so produced are unique in that they have low molecular weight, evidenced by melt indexes of between about 2 to 15 for polyethylene and low chromium levels, less than about 2.5 ppm chromium (without removing catalyst residues from the system).

Samples of the silica xerogels hereof may be found in the following Examples, which are intended as illustrative only:

EXAMPLES I–III AND CONTROLS A–D — PROPERTIES OF SILICA XEROGELS AND CONTROLS

Example I is directed to the xerogel of the invention prepared as described in the aforesaid U.S. Pat. No. 3,652,215, employing a solvent displacement drying technique. Example I-1-1 is directed to the gel of Example I of the U.S. Pat. No. 3,652,215 as obtained after calcination at 1,000° F, whereas Example I-1-2 relates to the gel of Example I of the U.S. Pat. No. 3,652,215 obtained after calcination in a fluidized bed at 1800° F. The xerogel of Example I-2 below corresponds to that of Example VII of the U.S. Pat. No. 3,652,215, Examples I-2-1, I-2-2, I-2-3, and I-2-4 hereof corresponding to the respective gel samples subjected to thermal aging at 95° C for 1, 1½, 2 and 4 hours, respectively, Example II is directed to the xerogel prepared as described in the aforesaid U.S. Pat. No. 3,652,216, employing an azeotropic distillation drying technique. Example II-1 is directed to the gel as prepared in Example I of the U.S. Pat. No. 3,652,216. Example II-2-1 relates to the gel of Example II of the U.S. Pat. No. 3,652,216 obtained after calcination at 1,000° F., whereas Example II-2-2 is directed to the gel of Example II of the U.S. Pat. No. 3,652,216 as obtained after calcination in a fluidized bed at 1800° F. Example II-3 hereof is directed to the xerogel prepared as described in Example IV of the U.S. Pat. No. 3,652,216.

Example III relates to the xerogel of the invention prepared as described in the aforesaid U.S. Pat. No. 3,652,214 employing a vacuum freeze-drying technique. Thus Example III-1-1 relates to the gel of Example I of the U.S. Pat. No. 3,652,214 as obtained after calcination at 1000° F, whereas Example III-1-2 is directed to the gel prepared as described in Example I of the U.S. Pat. No. 3,652,214 after calcination in a fluidized bed at 1800° F. Finally, Example III-2 hereof relates to the gel prepared as described in Example II of the U.S. Pat. No. 3,652,214.

Controls A–D relates to xerogel compositions which do not possess the characteristics of the present invention, e.g. do not have cumulative pore volumes in excess of about 2.0 cm³/g. The control compositions correspond to gels prepared as described in the following Examples of the aforesaid prior patents:

| Control | Example | Patent |
|---------|---------|--------|
| A | VI | "215 |
| B | VIII | "215 |
| C | III | "216 |
| D | XI | "214 |

The properties of the various silica xerogels of the indicated sample and control compositions are indicated in Table I.

TABLE I

PROPERTIES OF SILICA GEL SAMPLE AND CONTROL COMPOSITIONS

| Example | PV (cm³/g) | Av..PD (Å) | SA (m²/g) |
|---------|------------|------------|-----------|
| I-1-1 | 2.52 | 365 | 268 |
| I-1-2 | 2.54 | 365 | 278 |
| I-2-1 | 2.90 | 294 | 394 |
| I-2-2 | 2.76 | 311 | 355 |
| I-2-3 | 2.77 | 323 | 343 |
| I-2-4 | 2.56 | 362 | 284 |
| II-1 | 2.35 | 317 | 307 |
| II-2-1 | 2.53 | 313 | 323 |
| II-2-2 | 2.47 | 301 | 329 |
| II-3 | 2.50 | 300 | 333 |
| III-1-1 | 2.49 | 312 | 321 |
| III-1-2 | 2.47 | 301 | 329 |
| III-2 | 2.61 | 319 | 327 |
| Control | | | |
| A | 1.96 | 226 | 346 |
| B | 1.62 | 286 | 225 |
| C | 1.91 | 223 | 342 |
| D | 0.41 | 149 | 110 |

EXAMPLE IV AND CONTROL E — PROPERTIES OF THE POLYETHYLENES PRODUCED EMPLOYING CHROMIUM OXIDE CATALYSTS SUPPORTED ON SILICA XEROGEL TEST AND CONTROL COMPOSITIONS

This Example is directed to the xerogels prepared and tested as described in the aforesaid application Ser. No. 750,467, now abandoned. The xerogels of Examples IV-1, IV-2, and IV-3 were prepared, coated with chromium oxide and tested in the particle form polymerization of ethylene in the manner described in Examples 2 (Examples IV-1 and (IV-2 hereof) and 3 of the aforesaid application. The control xerogels E-1 through E-4 were commercially available "M.S. Catalysts" comprising pre-formed chromium oxide (2.1%) on silica xerogels, activated and employed in the particle form polymerization reaction as described in Examples 1 (Controls E-1 through E-3) and 3 (Control E-3) of the aforesaid Ser. No. 750,467.

In Examples IV-1, IV-2 and IV-3 the respective silica xerogels were prepared as follows:

10,080 g. of sodium silicate solution containing 28.7% $SiO_2$ and 8.9% of $Na_2O$ was added to 12,720 g. of water and cooled to 5° C., under agitation.

11,200 g. of $H_2SO_4$ (12.75 wt. %) was then added as follows:
 a. 4480 g. was added at a constant rate over a period of one hour, and
 b. the remainder was added over a period of 45 min.
  The final pH of the precipitate was 6.2 and the $SiO_2$ content was about 8.5%.

The slurry was then heated to 95° C. and held at that temperature for 3 hours. The gel was washed with a solution of 1113 g. of $NH_4NO_3$ in 45 gals. of water, and then with de-ionized water until the filtrate titrated less than 20 ppm $Na_2SO_4$.

The product was reslurried in acetone and washed with acetone until the water in the acetone titrated less than 1%.

The product was then homogenized and the acetone distilled off to reduce the acetone content to less than 1% by weight.

The silica gel obtained was calcined in an oven at 1000° F., for 4 hours before evaluation. The physical properties of the silica xerogel thus obtained were: pore volume (PV) = 2.66 cm.³/g. surface area (SA) = 307 m.²/g. and an average pore diameter (AV.PD.) = 347 A. The xerogel was coated with 2.1% $CrO_3$, to have a chromium level comparable to the commercially available M.S. Catalysts.

The coating was done by adding 813 g. of dry xerogel support and 16.45 g. of dry powdered chromium oxide into a ribbon blender. A vacuum of 28 inches of mercury was drawn on the blender and heat was applied so as to obtain a temperature of 250° C., in 3 hours. The heat was maintained for 2 hours, and the catalyst was then brought to room temperature and stored in air-tight containers.

Portions of the catalysts thus prepared were calcined in a fluidized bed using air flow rates of 0.2 ft.$^3$ per minute in an activator having a 4 inch diameter. The catalysts was thus activated at temperatures of 1750° F. (Example IV-1), 1825° F. (Example IV-2), and 1800° F. (Example IV-3). The respective maximum activation temperatures were maintained for 6 hours, after which the individual catalysts were stored under nitrogen until used.

The thus activated catalysts were evaluated for use in the particle form polymerization of ethylene within an 88 gal. loop reactor. Ethylene monomer, isobutane solvent and the respective catalysts were fed continuously into the reactor to maintain the ethylene saturation at 5% ± 1% and solids between 15 and 25%. The reactor temperature was maintained at about 230–233° F., the reactor pressure at 650 psig., and the polyethylene-containing slurry formed within the reactor was circulated therethrough at a rate of from 15–25 ft. per second. The polyethylenes thus produced were recovered and their melt indexes [by ASTM D-1238-65T(Condition E)], annealed densities and ash contents were determined.

The properties of the silica gels and the activated catalysts supported thereon, and the polymer properties obtained in the particle form polymerization reaction utilizing such catalysts, are set forth in Table II below for each of the xerogels of Examples IV-1, IV-2 and IV-3.

Control experiments E-1 through E-4 were carried out to compare the properties of polyethylenes produced employing the conventional M.S. Catalysts. 250 g. samples of the M.S. Catalysts were calcined in a fluidized bed at activation temperatures of 1600° F (Control E-1), 1700° F. (Control E-2), 1800° F. (Control E-3), and 1550° F. (Control E-4). The thus activated control catalysts were stored under nitrogen until ready for use, their pore volumes, pore diameters and surface areas were determined, and they were evaluated in the particle form reaction in the same manner as aforesaid. The properties of the activated M.S. Catalysts and the polymer properties obtained therewith are additionally set forth in Table II.

The polymerizations conducted with the catalysts of Example IV-3 and Control E-4 were carried out in the presence of a hydrogen modifier (hydrogen concentration, mole ratio of $H_2/Et = 1 \times 10^{-2}$). As will be noted from Table II, higher polymer melt indexes were obtained in the presence of the modifier. It will, however, further be noted that both in the polymerizations conducted with and without the modifier, substantially higher polymer melt indexes were achieved utilizing the catalysts supported on the silica xerogels of the present invention having the pore volume, pore diameter and surface area characteristic defined hereinabove, as compared with the M.S. Catalysts.

TABLE II

COMPARATIVE PROPERTIES OF POLYETHYLENES PRODUCED EMPLOYING CATALYSTS SUPPORTED ON SILICA GEL SAMPLE AND CONTROL COMPOSITIONS

| | Silica Gel Properties | | | Activated Catalyst Properties | | | Polymer Properties | | |
|---|---|---|---|---|---|---|---|---|---|
| Example | PV (cm$^3$/g) | Av. PD (Å) | SA (m$^2$/g) | Pore Volume (cm$^3$/g) | Average Pore Diameter (Å) | Surface Area (cm$^3$/g) | Milled MI | Annealed Density | Ash (ppm) |
| IV-1 | 2.66 | 347 | 307 | 2.14 | 340 | 252 | 3.2 | 0.9645 | 164 |
| IV-2 | 2.66 | 347 | 307 | 2.23 | 356 | 251 | 4.2 | 0.9647 | 184 |
| Control | | | | | | | | | |
| E-1 | — | — | — | N.A. | N.A. | N.A. | 1.3 | — | 211 |
| E-2 | — | — | — | 1.44 | 225 | 226 | 1.8 | — | 184 |
| E-3 | — | — | — | 1.25 | 259 | 193 | 1.6 | — | 330 |
| Polymerization Carried Out With Hydrogen Modifier | | | | | | | | | |
| Example | | | | | | | | | |
| IV-3 | 2.66 | 347 | 307 | 2.20 | 347 | 253 | 12.2 | 0.9668 | 305 |
| Control | | | | | | | | | |
| E-4 | — | — | — | 1.55 | 260 | 234 | 3.2 | 0.9699 | 238 |

EXAMPLES V AND VI AND CONTROLS F AND G — COMPARISON OF PROPERTIES OF ETHYLENE COPOLYMERS PRODUCED EMPLOYING CATALYSTS SUPPORTED ON SILICAL XEROGEL TEST AND CONTROL COMPOSITIONS

The silica xerogels hereof were compared with the silica gels embodied in the M.S. Catalysts in the same manner as described above in connection with Example IV and Control E. In Example V and Control F the catalysts embodying the respective gel supports were activated at 1800° F (Example V) and 1700° F (Control F), and were then utilized in the copolymerization of ethylene with hexene-1 (0.5 wt. %) at about 220° F. (Examle V-221.5° F; Control F-223° F). The properties of the respective xerogels and catalysts employed, and the ethylene-hexene copolymers obtained are set forth in Table III below.

In Example VI and Control G the catalysts embodying the respective xerogel supports were activated at 1800° F (Example VI) and 1550° F (Control G) and were then utilized in the copolymerization of ethylene with about 1.5 wt. % butene-1 (Example VI-1.6%; Control G-1.7%) at about 215° F. (Example VI-215° F; Control G-213° F). The properties of the respective xerogels and the catalysts embodying the same, and the ethylenebutene copolymers obtained therewith, are also set forth in Table III.

TABLE III

COMPARATIVE PROPERTIES OF ETHYLENE COPOLYMERS PRODUCED EMPLOYING CATALYSTS SUPPORTED ON SILICA GEL SAMPLE AND CONTROL COMPOSITIONS

| | Silica Gel Properties | | | Activated Catalyst Properties | | | Polymer Properties | | |
|---|---|---|---|---|---|---|---|---|---|
| Example | PV (cm³/g) | Av. PD (Å) | SA (m²/g) | Pore Volume (cm³/g) | Average Pore Diameter (Å) | Surface Area (cm³/g) | Milled MI | Annealed Density | Ash (ppm) |
| Production of Ethylene-Hexene-1 Copolymers | | | | | | | | | |
| V | 2.66 | 347 | 307 | 2.48 | 330 | 305 | 4.0 | 0.956 | 250 |
| Control F | — | — | — | 1.44 | 225 | 226 | 1.0 | 0.956 | 150 |
| Production of Ethylene-Butene-1 Copolymers | | | | | | | | | |
| Example VI | 2.66 | 347 | 307 | 2.12 | 335 | 242 | 2.50 | 0.9430 | 72 |
| Control G | — | — | — | 1.60 | 213 | 300 | 0.14 | 0.9425 | 70 |

It will be seen from Tables II and III that the silica xerogels of the present invention provide supports for stereospecific catalysts useful in ethylene particle form polymerizations to produce polymers having significantly greater melt indexes then polymers obtained utilizing prior art silica gel-supported catalysts, at the same activity levels.

It will be understood that various changes may be made in the silica xerogel compositions exemplified hereinabove without departing from the scope of the present invention. Accordingly, the preceding specification is intended as illustrative only, and not in a limiting sense.

What is claimed is:

1. A silica xerogel having the following characteristics:
   a. a nitrogen pore volume greater than 1.96 cc/g. and up to 2.90 cc/g., said pore volume being equal to the volume of the pores in said gel having pore diameters of up to 600 Å and being determined as that volume of nitrogen adsorbed by and condensed in the pores of said gel per gram of the dry gel at the normal boiling point of liquid nitrogen and at a relative pressure $P/P_o$ equal to 0.967 wherein P is the pressure of the nitrogen vapor over the gel and $P_o$ is the vapor pressure of liquid nitrogen;
   b. the major portion of said nitrogen pore volume being provided by pores having pore diameters within the range of from 300–600 Å; and
   c. a surface area within the range of from 200–500 m²/g.

2. The silica xerogel of claim 1, wherein the nitrogen pore volume is within the range of from 2.35 cc/g. to 2.90 cc/g.

* * * * *